US010045354B2

(12) United States Patent
Lou et al.

(10) Patent No.: US 10,045,354 B2
(45) Date of Patent: Aug. 7, 2018

(54) ADAPTIVE CHANNEL MAPPING FOR WIRELESS COMMUNICATIONS

(71) Applicant: Starkey Laboratories, Inc., Eden Prairie, MN (US)

(72) Inventors: Heng Lou, Eden Prairie, MN (US); Jeffrey Paul Solum, Greenwood, MN (US); Chaitanya Jidge, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 15/080,037

(22) Filed: Mar. 24, 2016

(65) Prior Publication Data
US 2017/0280458 A1    Sep. 28, 2017

(51) Int. Cl.
*H04W 72/00* (2009.01)
*H04W 72/04* (2009.01)
*H04W 76/02* (2009.01)
*H04W 4/00* (2018.01)
*H04R 25/00* (2006.01)
*G06F 3/16* (2006.01)
*H04W 76/10* (2018.01)
*H04W 4/80* (2018.01)

(52) U.S. Cl.
CPC ........ *H04W 72/0486* (2013.01); *G06F 3/165* (2013.01); *H04R 25/554* (2013.01); *H04W 4/008* (2013.01); *H04W 4/80* (2018.02); *H04W 76/02* (2013.01); *H04W 76/10* (2018.02); *H04R 2225/55* (2013.01)

(58) Field of Classification Search
CPC ..... H04W 48/16; H04W 8/005; H04J 4/0277; H04J 3/1635; H04R 25/554; H04R 25/552

USPC ....... 455/63.4, 450; 370/252, 282, 389, 466; 381/15, 315
See application file for complete search history.

(56) References Cited

U.S. PATENT DOCUMENTS 5,777,762 A * 7/1998 Yamamoto .......... H04J 14/0227
                                                        370/389
5,873,037 A * 2/1999 Zicker ..................... H04M 1/27
                                                        455/450

(Continued)

FOREIGN PATENT DOCUMENTS

| EP | 2824901 A1 | 1/2015 |
| WO | WO-2014180517 A1 | 11/2014 |
| WO | WO-2015152797 A1 | 10/2015 |

OTHER PUBLICATIONS

"European Application Serial No. 7162818.3, Extended European Search Report dated Aug. 22, 2017", 6 pgs.

*Primary Examiner* — William D Cumming
(74) *Attorney, Agent, or Firm* — Schwegman Lundberg & Woessner, P.A.

(57) ABSTRACT

Disclosed in some examples are devices, methods, systems, and machine readable media that reduce the burden of a master device of a second wireless connection by utilizing the channel map of a first wireless connection. Since both the first and second wireless connections are located at nearly the same location, the "good channels" are very similar for both connections. Therefore a second wireless connection may take advantage of the channel assessment conducted by a first wireless connection in identifying channels by using one or more channels of the first wireless connection for communications in the second wireless connection.

21 Claims, 4 Drawing Sheets

(56) References Cited

U.S. PATENT DOCUMENTS

| | | | | |
|---|---|---|---|---|
| 6,366,589 B1* | 4/2002 | Naudus, Jr. | ............ | H04L 5/023 |
| | | | | 370/282 |
| 6,381,340 B1* | 4/2002 | Storey | .................... | G01C 21/16 |
| | | | | 348/169 |
| 6,782,002 B1* | 8/2004 | Dashiff | ................ | H04J 3/1635 |
| | | | | 370/466 |
| 9,609,443 B2* | 3/2017 | Ruaro | ................ | H04R 25/554 |
| 9,628,924 B2* | 4/2017 | Bauman | .............. | H04R 25/554 |
| 9,661,426 B2* | 5/2017 | Ozden | .................... | H04R 25/02 |
| 2004/0037563 A1* | 2/2004 | Augustsson | ....... | G02B 6/29353 |
| | | | | 398/83 |
| 2005/0159108 A1* | 7/2005 | Fletcher | .............. | H01Q 3/2605 |
| | | | | 455/63.4 |
| 2007/0206660 A1 | 9/2007 | Lifchuk | | |
| 2010/0060786 A1* | 3/2010 | Kim | ........................ | H04N 5/50 |
| | | | | 348/463 |
| 2014/0169599 A1* | 6/2014 | Solum | ................. | H04R 25/554 |
| | | | | 381/315 |
| 2014/0355582 A1 | 12/2014 | Kamath et al. | | |
| 2014/0376392 A1* | 12/2014 | Hegde | ................. | H04W 48/16 |
| | | | | 370/252 |
| 2015/0010179 A1 | 1/2015 | Solum et al. | | |
| 2015/0237491 A1* | 8/2015 | Selen | .................... | H04W 8/005 |
| | | | | 455/450 |
| 2017/0111834 A1* | 4/2017 | Belverato | ............ | H04B 5/0006 |
| 2017/0150278 A1* | 5/2017 | Ruaro | .................. | H04R 25/552 |
| 2017/0245291 A1* | 8/2017 | Liu | .................... | H04W 72/085 |
| 2017/0280458 A1* | 9/2017 | Lou | ....................... | H04W 76/10 |

* cited by examiner

ADAPTIVE CHANNEL MAPPING FOR WIRELESS COMMUNICATIONS

TECHNICAL FIELD

The present subject matter pertains to adaptive channel mapping for wireless connections. Some embodiments relate to adaptive channel mapping in BLUETOOTH® Low Energy (BLE) scatternets.

BACKGROUND

Wireless communication systems may employ a number of wireless connections between different devices. One type of wireless connection, such as a piconet, involves two or more devices that wirelessly communicate on the same physical channel and communicate with each other by agreeing on a set of common communication parameters. Such communication parameters may include a common clock, channel map, and hopping sequence that is synchronized between the two or more devices. In such networks, devices may have more than one wireless connection active at a time. For example, a device that is a member of two or more piconets is said to be involved in a scatternet.

A multitude of wireless devices may participate in wireless networks. One example of devices in a wireless network includes hearing devices, which communicate with an increasing number of wireless devices. Some examples of hearing devices are headsets, hearing aids, speakers, cochlear implants, bone conduction devices, and personal listening devices. Hearing devices increasingly accommodate wireless communications and benefit from a variety of networks. There is a need in the art for better communications with hearing communication devices in communication systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
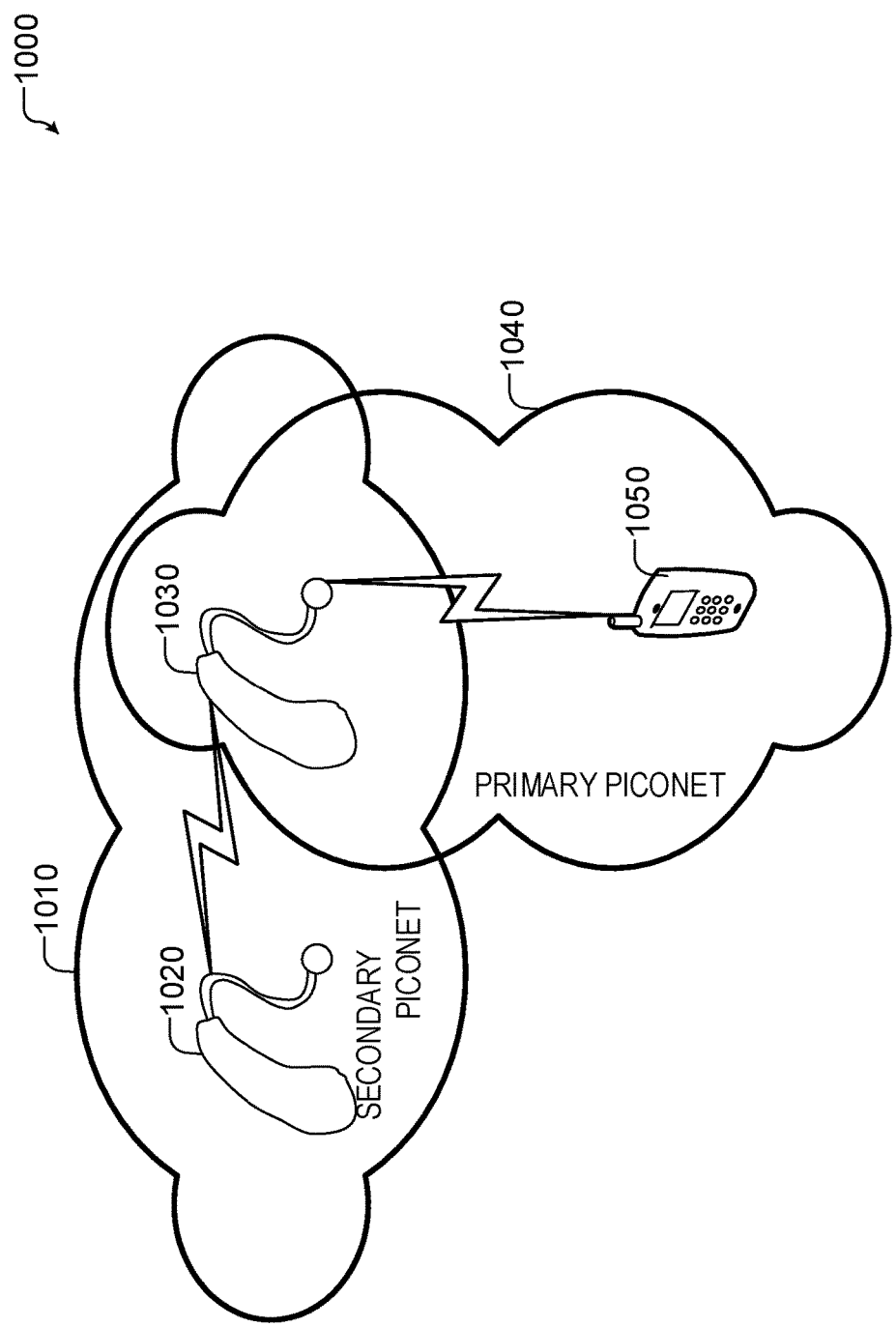
FIG. 1 shows a schematic of a scatternet comprising two piconets according to some examples of the present disclosure.

Within wireless connections, such as a piconet, various network management tasks are undertaken by a device that is designated as the master device. Other devices participating in the piconet are termed slave devices. One of the network management tasks undertaken by the master device is identifying the communication channels (frequencies) that are to be used for communications in the wireless connection. The channels used for communications may be indicated with a data structure called a channel map. Devices participating in the wireless connection may receive a channel map from the master device when joining the wireless connection or when the channel map is updated through a channel update procedure. Devices participating in the wireless connection then tune their transceivers at the appropriate times to the one or more indicated channels. In some examples, the devices participating in the wireless connection employ frequency hopping, and the channel map specifies a plurality of channels to which the devices hop to in a defined sequence.

The channels in the channel map are selected by the master device using a channel assessment process. Channel assessment is a process of determining a set of channels from the plurality of available channels that are considered to be "good" channels. Good channels are channels that are free from interference from other wireless communications. For example, a channel may be good when one or more channel quality measurements satisfies one or more predetermined criteria. For example, a good channel may be where a Received Signal Strength Indicator (RSSI) of a channel not currently being used by the wireless connection is below a predetermined threshold (e.g., there is no traffic generating a received signal). Another example of a good channel may be where a channel that is being used by the wireless connection exhibits a packet error or retransmission rate for communications of the wireless connection that is below a predetermined threshold.

Once adequate channels are identified, the master device of the wireless connection communicates a new channel map to all the slave devices within a piconet. This may happen when a slave device connects to the wireless connection. Additionally, because the RF environment is subject to change, the master may periodically perform channel assessment and as a result of this new channel assessment, may change the channels used for the wireless connections. The channel map is updated with the new channels and these updates are communicated to the participants in the wireless connection through a channel update procedure.

The master device may use various methods for performing channel assessment. Methods may be categorized into active scanning, passive scanning, and Wireless Local Area Network (WLAN) look ahead methods. In active scanning the master uses its transceiver to look for interference on particular channels during times when the transceiver is not being used for active communications in the wireless connection (for example, between BLE connection events). The transceiver may tune into channels one at a time (e.g., using a round robin approach) and measure the RSSI on each channel. If the RSSI exceeds a peak threshold level over a predetermined time window (meaning that transmissions are occurring on the channel unrelated to the wireless connection), the channel will not be considered good. In this case, it will be placed on a list of channels that are not used. If the channel is currently in use, it may be removed from candidate channels that may be used for the wireless connection.

Passive scanning is where the master device monitors one or more quality metrics of channels used by the wireless connection. The master device collects these metrics as communications of the wireless connection occur on these channels. If the metrics for a particular channel cross a predetermined threshold, the particular channel may be removed from use. For example, if a RSSI of communications over the wireless connection on a particular channel falls below a threshold, the particular channel may be removed from use in the wireless connection. In other examples, the master device may monitor the number of retransmissions on a particular channel used by the wireless connection. If the number of retransmissions of traffic belonging to the wireless connection on a particular channel over a predetermined time interval exceeds a threshold, the particular channel may be removed from use.

WLAN look ahead may be utilized in certain situations in which the master device also has a WLAN transceiver. In this scenario the master may be able to avoid WLAN interference by knowing the transmission parameters of the WLAN network. For example, if the WLAN transceiver is communicating over a certain frequency range, the channels that correspond to those frequency ranges may be removed from use or avoided. In other examples, if the WLAN transceiver is transmitting on a certain channel at certain time, the master may schedule the frequency hopping of the wireless connection such that the wireless connection "hops" to that certain channel at times the WLAN is not expected to be using that certain channel.

Certain wireless devices that may participate in a wireless connection such as a piconet may find it difficult to perform channel assessment or other duties of the master device. Specifically, scanning channels between communications is power and processor intensive. Even tracking a number of retransmissions over a period of time requires some memory and processing power. Devices that may have limited battery, limited processing power, limited wireless transceivers, limited memory, or other limitations may find it difficult to determine a channel map while still providing the functionality for which they were designed. While this is not a problem for wireless connections that feature at least one device with sufficient capabilities to take on this role, it becomes a problem in wireless connections where the wireless connection is made up entirely of devices with these limitations.

For example, pairs of hearing devices may form wireless connections (such as piconets) with each other such that the pair may communicate with each other to exchange parameters, streaming audio, and the like. Hearing devices often lack large batteries (as they may be designed to be very small for cosmetic and comfort reasons) and may have limited processing capabilities. In order to connect with each other, one of these hearing devices takes on the role of a master device that must expend power performing channel assessment and other functions.

In addition to forming a wireless connection with another hearing device, one or more of the hearing devices may form a second wireless connection (e.g., a second piconet forming a scatternet) with a device such as a laptop computer or smartphone. This second wireless connection may allow audio such as audio from a television or telephone conversation to be streamed to the hearing device for playback. For example, streaming audio from a laptop, smartphone, television, or the like may be streamed to a slave hearing device in a first piconet for playback through a speaker in the hearing device. This hearing device may then forward the streaming audio acting as master over a second piconet to the second hearing device acting as slave to the first hearing device (e.g., on a different ear of a wearer) for playback on a speaker in the second hearing device. In the first piconet, the streaming audio source, with its increased capabilities as compared with the hearing device, may be appointed the first master. This device then has the responsibility for channel assessment for the first piconet. However, since the second piconet is made up of two devices with the first hearing device acting as master in the second piconet and the second hearing device acting as slave each with more limited capabilities than the master of the first piconet, neither device may be desirable for channel assessment.

Disclosed in some examples are devices, methods, systems, and machine readable media that reduce the burden of a master device of a second wireless connection by utilizing the channel map of a first wireless connection. Since both the first and second wireless connections are located at nearly the same location, the "good channels" are very similar for both connections. Therefore a second wireless connection may take advantage of the channel assessment conducted by a first wireless connection in identifying channels by using one or more channels of the first wireless connection for communications in the second wireless connection. The second wireless connection is referred to herein as the "secondary" wireless connection (e.g., secondary piconet) as its channel map is derived from the first wireless connection, which is referred to as the "primary" wireless connection (e.g., primary piconet). The master device of the secondary wireless connection is termed an intermediary device and takes the role of a slave device in the primary wireless connection. By being the slave device in the primary wireless connection, the intermediary device has access to the channel map of the primary wireless connection. If the primary wireless connection's master device is a device with a large battery, powerful transmitter, sensitive receiver, high gain antenna, and higher processing power, the burden of scanning for channels is lessened on devices in secondary wireless connections in the area without such capabilities. Furthermore the master of the primary piconet may also be a dual mode device having WiFi capability and thus knowledge of local WiFi activity which further improves the channel selection for the primary piconet.

If too many channels from the primary wireless connection's channel map are shared by the secondary wireless connection, the master device of the primary wireless connection may detect this as interference and may remove these channels from the channel map and find less desirable channels. These less desirable channels may be subject to more interference and this may impact communications on the primary wireless connection. Furthermore, as the secondary wireless connection continually monitors changes to the channels used by the primary wireless connection (to account for changing radio frequency (RF) conditions), updates to the primary wireless connection's channels may propagate to the channels used by the secondary wireless connection. These channels may then eventually be marked as bad (due to interference of the secondary wireless connection), causing the primary wireless connection to again find new channels. In some examples, this may repeat many times, preventing reliable communication on the primary or secondary wireless connection.

In some examples, to prevent the degradation of the primary wireless connection, the channels of the channel map of the primary wireless connection utilized by the secondary wireless connection may not be all of the channels in the primary wireless connection's channel map. That is, the intermediary device may reserve a number of good channels from the primary wireless connection that are used exclusively for the primary wireless connection and are not actively used for the secondary wireless connection. Periodically, reserved channels may be rotated with active channels used by the secondary wireless connection. Rotating the channels used by the secondary wireless connection from the entire pool of good channels received from the primary wireless connection has at least three benefits.

First, the primary wireless connection is less likely to remove a good wireless channel due to interference from the secondary wireless connection. For example, the rotation interval may be short enough that the channels used by the secondary wireless connection are not being used long enough that it causes the primary wireless connection to detect interference and drop these channels. This may be especially true if the secondary wireless connection is utilizing frequency hopping since the time the secondary wireless connection will be occupying a particular one of the channels will be smaller as the secondary wireless connection "hops" through the channels in the channel map.

Second, even if the primary wireless connection drops some of the channels used by the secondary wireless connection, the rotation scheme ensures that once those channels are rotated out of active use by the secondary wireless connection, they will be eventually be re-added by the primary wireless connection. If the source of interference that caused the primary wireless connection to drop these channels was interference from the secondary wireless connection, then once these channels are no longer used by the secondary wireless connection, the primary wireless connection may re-add these channels to its channel map once it detects the absence of the interference from the secondary wireless connection.

Finally, the use of the rotation scheme allows for the secondary wireless connection to determine whether the primary wireless connection removed a channel from its channel map was the result of interference with the secondary wireless connection or whether the primary wireless connection removed a channel as the result of interference with another source. For example, the secondary wireless connection may continue to use a channel that is removed from the channel map of the primary wireless connection until it is rotated out as a result of the rotation algorithm. In some examples, before it is rotated back in, the channel must be re-added to the primary wireless connection's channel map. If the interference at the primary wireless connection was caused by the secondary wireless connection, then the channel may be re-added by the primary wireless connection and may then re-enter the pool of available channels at the secondary wireless connection. Otherwise, if the interference was a result of an external source, the primary wireless connection may not re-add the channel until the external interference is gone, and thus the secondary wireless connection may not rotate the channel back into use until it is again part of the primary channel's channel map.

The number of reserved channels may be configurable. For example, a system designer may determine that the primary wireless connection is to have two reserved channels. The intermediary device may use all but two of the channels in the channel map of the primary wireless connection. In some examples, if the number of channels used by the primary wireless connection drops below a configurable threshold, the intermediary device may reduce the number of reserved channels used by the secondary wireless connection by a configurable amount. This may sacrifice some quality on the primary wireless connection to ensure that the secondary wireless connection is still able to communicate. For example, if the number of channels in the channel map drops below three, the number of channels reserved for the primary wireless connection may be reduced from 2 to 1.

In some examples, the number of reserved channels may be increased or decreased based upon observed communications in the primary wireless connection. For example, the intermediary device (which is also a slave device in the primary wireless connection) may monitor a communication parameter of the primary wireless connection to determine if the secondary wireless connection is interfering with the primary wireless connection. Example communication parameters monitored include an RSSI, a number of retransmissions, a bit error rate, and the like. If the communication parameter indicates that the secondary wireless connection is interfering with the primary wireless connection (e.g., by being outside an acceptable, predetermined range or threshold), the number of reserved channels may be increased. In some examples, if the communication parameter indicates that the secondary wireless connection is not interfering with the primary wireless connection, then the number of reserved channels may be decreased. This process may be repeated periodically in order to find and maintain the optimum number of reserved channels.

In some examples, the master device of the primary wireless connection may be configured to be aware of the channel sharing, but in other examples, the master device of the primary wireless connection may be unaware that its channels are being utilized in this way.

To adapt to changing wireless conditions, the intermediary device may monitor any changes made to the channels used by the primary wireless connection. For example, the master device of the primary wireless connection may determine that the RF conditions of a channel may have changed and it is no longer a good channel. This channel is then removed from the channel map. The intermediary device (who is a slave of the second wireless connection) then learns of this through a channel update procedure initiated by the master device of the primary wireless connection.

In some examples, the intermediary device may then also remove this channel from use with the secondary wireless connection. The intermediary device may select another channel from the primary wireless connection's channel map to replace the removed channel.

In other examples, the intermediary device may continue using a channel deleted from the primary wireless connection's channel map until it is rotated out of use of the secondary wireless connection through a channel rotation. Once it is rotated out, it may be removed from the reserved channel list and not re-added until the primary wireless connection adds it back to its channel map. In other examples, once it is rotated out, it may remain in the reserved channel list, but not used for communications on the secondary connection until it is again placed in the channel map of the primary wireless connection.

The removed channel may considered good again if the master device of the primary wireless connection discovers this through an active scanning channel assessment technique at a later time. At that point, it may be re-added to the channel map of the primary wireless connection. The intermediary device may then detect this change and also add this channel to its channel map. Thus the secondary wireless connection may mirror the channel additions and deletions to the channel map of the primary wireless connection. As already noted, these additions and deletions may be subject to reserved channel allocations for the primary wireless connection.

In other examples, the intermediary device will perform limited channel assessment of its own. For example, various passive assessment techniques may be more easily performed than active scanning techniques. Examples include an RSSI for a channel used by the secondary wireless connection falling below a predetermined threshold, a number of retransmissions over a predetermined period of time exceeds a predetermined threshold, or the like. The intermediary device may then replace this channel on its channel map with another channel from the primary wireless connection's channel map, subject to maintaining a number of reserved channels for the primary wireless connection.

As noted, in some examples, in order to keep the channel map dynamic, the intermediary device may periodically remove a good channel or small subset of good channels from its channel map. Those channels are then replaced by other good channels from the reserved list. In particular the secondary wireless connection will add any good channels that are newly discovered by the primary wireless connection to its channel map. This will keep the channel map for the secondary wireless connection relatively fresh. For example if someone is walking around in an enterprise with a lot of WLAN access points, the secondary wireless connection's channel map will not become "stale" and will remain free from interference even as a person moves about the enterprise wearing their hearing aids or other body worn electronics.

The secondary wireless connection may be comprised of hearing instruments having ear-to-ear communication but is not limited to this configuration. It may be used with other body worn communication devices such as a microphone array or other health monitoring sensors. Still further it may be used for both on body and off body communication with other devices and sensors. The techniques described herein can be generally applied to applications where a channel assessment done by one device for one wireless connection may be shared with other wireless connections at a similar physical location. With the disclosed techniques, wireless connections can coherently work at a given physical location with their good channels and adaptively change the channels in the "good channel pool" to avoid RF interference outside of the scatternet for better overall wireless communication.

As noted, one example wireless connection refers to BLUETOOTH® piconets and scatternets. One of ordinary skill with the benefit of the present disclosure will appreciate that the present subject matter is applicable to other wireless connections, such as those that are created with other wireless technologies. The techniques of the present disclosure may be applied to any wireless technology in which a channel assessment is performed and in which a device engaged in one wireless connection may utilize the channel assessment information in managing a second wireless connection. Other example wireless technologies include Long Term Evolution (LTE), WLAN (e.g., a network operating according to an Institute for Electrical and Electronic Engineers (IEEE) 802.11 family of standards), BLUETOOTH®, BLUETOOTH® LOW ENERGY (BLE), ZIGBEE®, SHOCKBURST®, ENHANCED SHOCKBURST®, or the like.

In some examples, the disclosed techniques may be for two different connections using the same wireless technology (e.g., two different piconets), but in examples in which two different protocols utilize the same frequencies, the disclosed techniques may also be applied across different wireless technologies. That is, a channel assessment performed using one wireless technology may be applied to a wireless connection using a different wireless technology. For example, a channel assessment on a WLAN network may be applied to a BLUETOOTH® piconet by a device participating in both a WLAN wireless connection and the BLUETOOTH® piconet.

FIG. 1 shows a schematic of a scatternet 1000 comprising two piconets according to some examples of the present disclosure. Secondary piconet 1010 is a piconet formed by two hearing devices 1020 and 1030. Hearing device 1030 is an intermediary device as it is the master device of the secondary piconet 1010 and a slave device in a primary piconet 1040. Mobile device 1050 is a master device in the primary piconet 1040 and performs the channel assessment by determining a subset of the set of usable channels of a given communication protocol (e.g., BLE) to use for communications within the primary piconet 1040. This may be based upon channel scans, WLAN look ahead, or passive scanning. As previously discussed the channels that are classified as good and used by the primary piconet 1040 may be identified in a channel map. When hearing device 1030 connects to the primary piconet 1040, mobile device 1050 informs the hearing device 1030 of the channel map. Hearing device 1030, being the master device of the secondary piconet 1010 determines which of these channels to reserve to the primary piconet 1040 and then selects one or more of the available remaining channels to use for the secondary piconet 1010. The channels that hearing device 1030 of secondary piconet 1010 selects may be communicated to hearing device 1020 through a channel map. For example, the channel map may be communicated to hearing device 1020 when that hearing device joins the secondary piconet 1010 or with a channel update procedure.

Intermediary device 1030 may periodically receive channel updates from the mobile device 1050 updating the channels used for communication within the primary piconet 1040. For example, the mobile device 1050 may send a channel update message with an updated channel map. If the channel update adds a new channel to the channel map, the secondary piconet 1010 may also add the new channel (subject to the reserved channel list) to its channel map.

In some examples, if the channel updates remove a channel from the channel map and the channel removed was a reserved channel, the secondary piconet 1010 may remove a channel from its channel map and allocate that channel as a reserved channel to the primary piconet 1040. If the channel removed was a channel utilized by the secondary piconet 1010, the secondary piconet may also remove that channel from its channel map and select another channel from the primary piconet's channel map subject to the reservation rules. As previously discussed, the secondary piconet 1010 may utilize the channel update procedure to update the channels used in the secondary piconet 1010.

In other examples, if the channel updates remove a channel from the channel map and the channel removed was utilized by the secondary piconet 1010, and if the secondary piconet 1010 employs channel rotation, the secondary piconet may continue using that channel until it is rotated out of use to the reserved list of channels. Once at the reserved list of channels, the channel may be removed altogether (until it is readded to the channel map of the primary piconet 1040) or may be held in reserve, and not used for active communications of the secondary piconet 1010 until it is re-added to the channel map of the primary piconet 1040.

Figure 2:
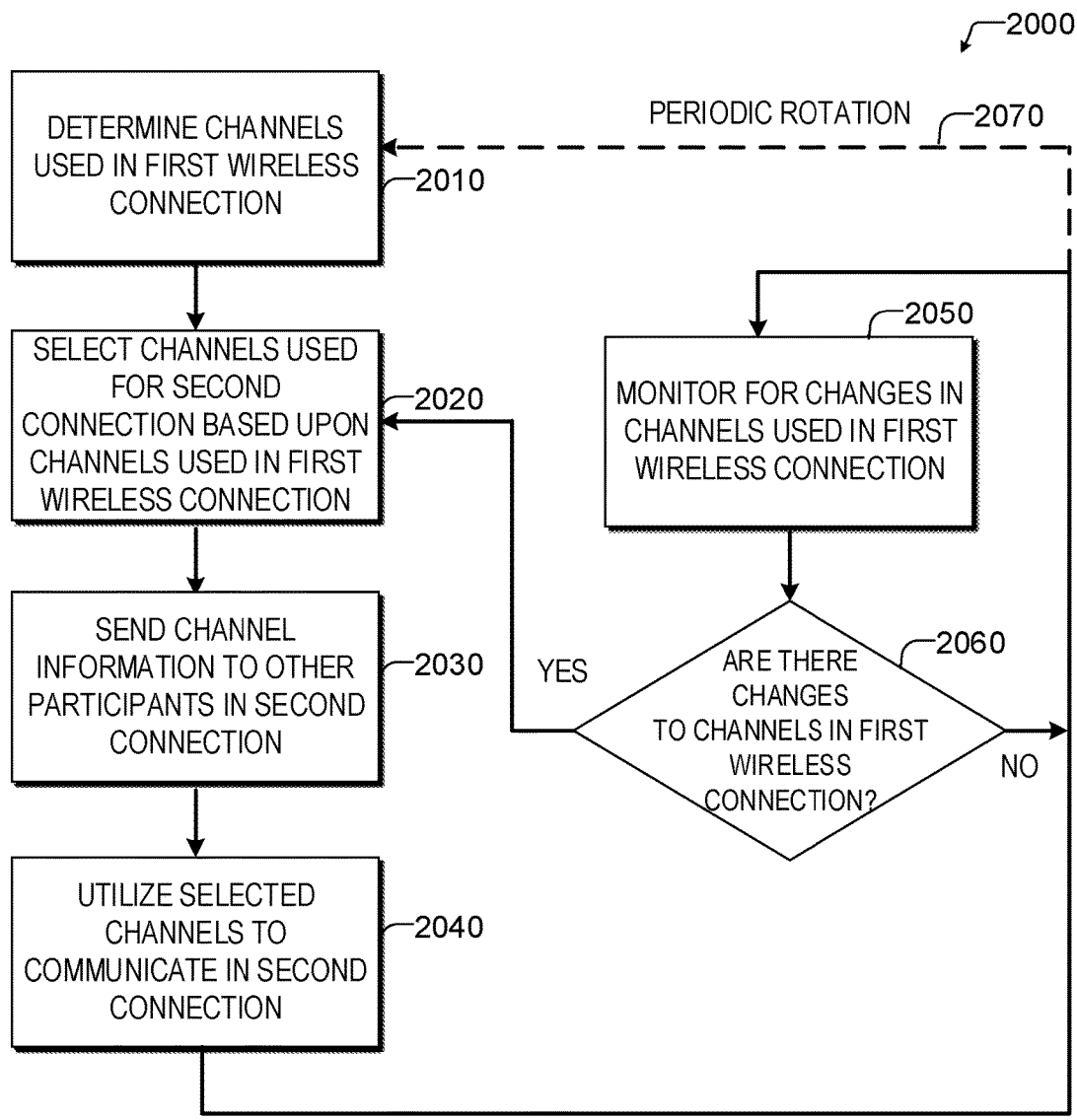
FIG. 2 shows a flowchart of a method of selecting channels for use in a second wireless connection according to some examples of the present disclosure.

Turning now to FIG. 2, a flowchart of a method 2000 of selecting channels for use in a second wireless connection is shown according to some examples of the present disclosure. FIG. 2 may be implemented by an intermediary device. Operations 2010-2040 may be performed when establishing the secondary wireless connection, when the intermediary device joins the primary wireless connection, every predetermined rotation interval (as shown by dotted line 2070), and when changes are detected in the channel map of the primary wireless connection (as shown by operations 2050 and 2060). At operation 2010 the intermediary device determines the channels that are being used in the first connection. In some examples, this may be done when the intermediary device connects to the primary wireless connection.

In other examples, the master device of the primary wireless connection may update the channel map through a channel map update procedure. In some examples the channel map as sent by the master device may be a bitmap with each bit position corresponding to a particular channel. Channels with a '1' in the corresponding bit position are channels that are to be used by the primary wireless connection (e.g., are considered "good" channels), and channels with a '0' are not used by the primary wireless connection (e.g., channels that are considered "bad" channels). In still other examples, the channels that are being used in the first connection may be determined from the list of channels received in the last channel map received from the first connection.

At operation 2020 the intermediary device selects the channels used by the second wireless connection (e.g., the secondary piconet). In some examples, all the channels of the primary wireless connection may be used. In some examples, a subset of the channels of the primary wireless connection may be used. In some examples, channels that are not channels used by the primary wireless connection may be used (e.g., the secondary wireless connection may prefer certain channels or conduct a limited assessment of some channels).

In some examples, the channels of the primary wireless connection that are used by the secondary wireless connection may be subject to reserving a number of channels for the primary wireless connection. For example, a predetermined number of channels may be reserved in a pool of unused, reserved channels. The secondary wireless connection may use any of the channels in the channel map as long as the predetermined number of channels are reserved for use in the primary wireless connection. In some examples, if the secondary wireless connection already is transmitting on certain channels, the intermediary device may prefer to reserve the primary wireless connection channels it is not already using so as to avoid changing the channel map of the secondary wireless connection. For example, if the secondary wireless connection is using channels 1, 5, and 7, and reserves channel 10 for the primary wireless connection and the channel update removes channel 10 and adds channel 8, the intermediary device may reserve channel 8 rather than using channel 8 and allocating one of the channels it is using (1, 5, and 7) as reserved. This may avoid a channel update procedure.

In some examples, channels may be rotated periodically (based upon a determined rotation interval) between the channels being actively used by the secondary wireless connection and the channels in the reserved pool. Thus, some of the operations of FIG. 2 may be performed periodically to achieve this rotation (as shown by dotted line 2070). For example, one or more channels that were previously reserved by the intermediary device may be utilized for secondary wireless connection communications and one or more channels that were previously used for secondary wireless connection communications may be put on the reserved list. This lowers the chances that the primary wireless connection would drop a channel from its channel map due only to interference from the secondary wireless connection. This also increases the chances that if a channel were dropped only because of interference from the secondary wireless connection, that the channel would be re-added to the channel map by the primary wireless connection. In some example implementations, in order to move a channel to an active channel from a reserved channel, the channel must be one of the channels used currently by the primary wireless connection. As previously discussed, this allows the intermediary device to continue using channels that are removed from the channel map by the master device of the primary wireless connection due only to interference from the use of the channel at the secondary wireless connection.

The rotation interval may be constant, or may be adjusted up or down depending on a frequency of incidences where channels are being removed by the primary wireless connection directly as a result of interference by the secondary wireless connection. For example, the system may track a rate at which a channel that is dropped from the channel map of the primary wireless connection, but is re-added to the channel map of the primary wireless connection after it is rotated out-of-use at the secondary wireless connection. The system may increase the rate of rotation of the channels in response to an increase in this rate exceeding a predetermined threshold. Similarly, the rate of rotation of the channels may be decreased in response to this rate falling below a second predetermined threshold.

As already noted, the number of reserved channels may be adjusted up and down on the fly from a configurable and predetermined number of reserved channels based upon one or more of: the RF environment, the needs of the secondary wireless connection, the communication status of the primary wireless connection, and the communication status of the secondary wireless connection. For example, if the number of good channels in the channel map of the primary wireless connection minus the current number of reserved channels would be below a particular predetermined threshold, the number of reserved channels allocated to the primary wireless connection may be reduced. This is to allow both the primary wireless connection and the secondary wireless connection access to enough channels for reliable communication.

Furthermore, in some examples, the number of reserved channels allocated to the secondary wireless connection may be increased or decreased based upon the RF conditions of either the secondary or primary wireless connection. For example, the system may specify that the secondary wireless connection is prioritized over the primary wireless connection. In these examples, the secondary wireless connection reduces the number of reserved channels until a metric of the secondary wireless connection reaches a predetermined threshold. For example, the number of reserved channels may be reduced until the RSSI of communications of the secondary wireless connection exceeds a predetermined threshold. In other examples, the system may specify that the primary wireless connection is prioritized over the secondary wireless connection. In these examples, the secondary wireless connection increases the number of reserved channels until a metric of the primary wireless connection (as measured by the master of the secondary wireless connection which is also a slave device in the primary wireless connection) reaches a predetermined threshold. For example, the number of reserved channels may be increased until the RSSI of communications of the primary wireless connection exceeds a predetermined threshold. This measurement of either the master or the secondary wireless connection and adjustment of the reserved channels may be done periodically to assure that the target metrics are being met on an ongoing basis.

At operation 2030 the intermediary device may send a channel map to other participants in the secondary wireless connection as a channel update procedure. As can be appreciated, if the channels do not change, a channel update procedure is not needed. As explained above the update may comprise a channel map which may be represented as a bitmap with respective bit positions representing respective channels.

At operation 2040 the selected channels are utilized in the communications of the second wireless connection. In some examples, the device may perform the method of FIG. 2 when the second wireless connection is active and when the first wireless connection is active in at least partially overlapping time periods. An active wireless connection may be for example, when the devices are participating in the wireless connection, or are otherwise in a wireless communication session with another device, even if data is not being actively transmitted.

At operation 2050 the intermediary device monitors for changes in channels used in the first wireless connection (the secondary wireless connection). At operation 2060 a determination is made if there are changes. If there are changes then flow returns to operation 2020 where channels from the updated channel map are selected and communicated to the slave devices in the second wireless connection. If at operation 2060 there are no changes, the intermediary device continues monitoring for any changes at operation 2050.

Figure 3:
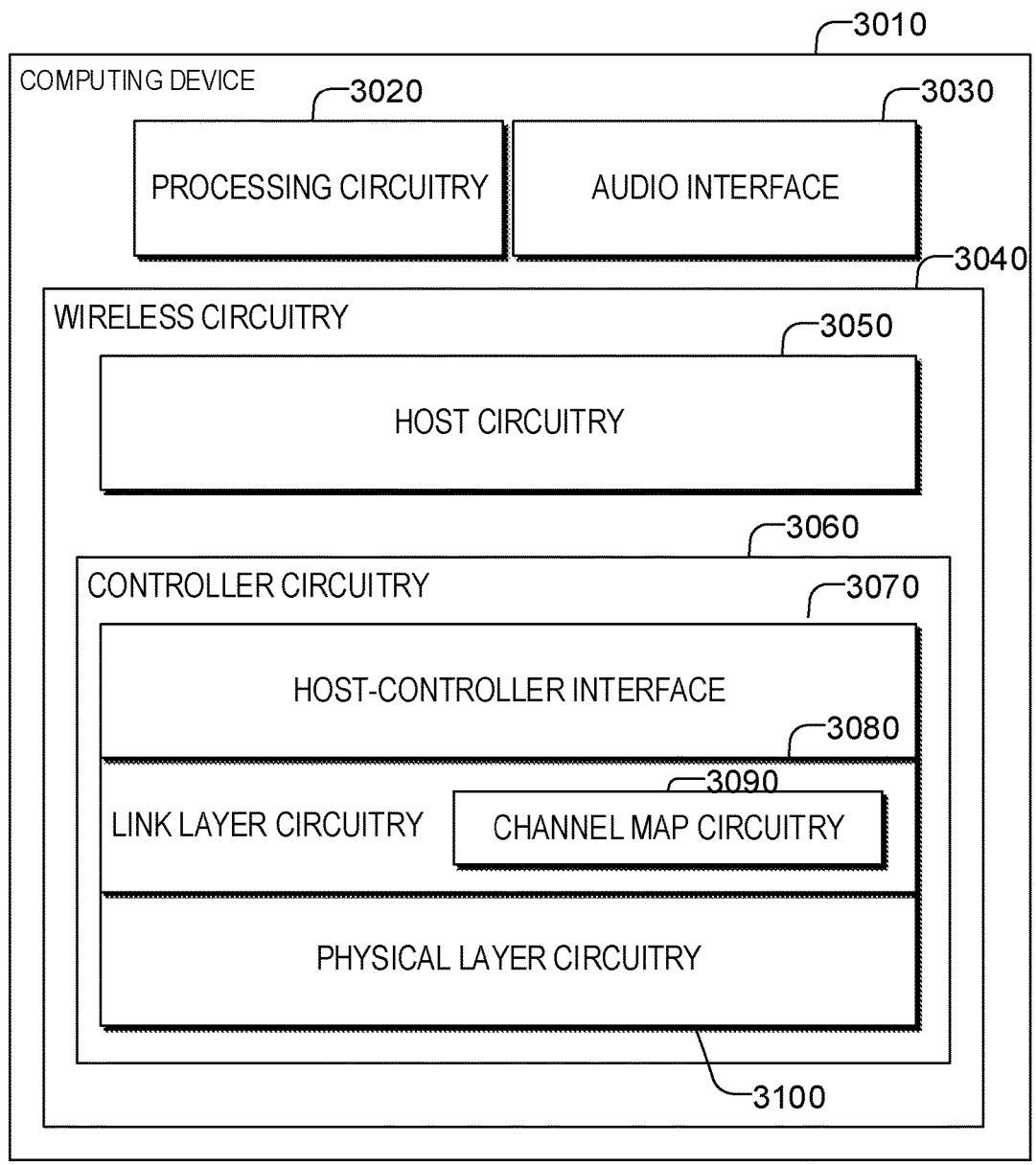
FIG. 3 shows a schematic of an example computing device according to some examples of the present disclosure.

Turning now to FIG. 3, a schematic of an example computing device 3010 is shown according to some examples of the present disclosure. Computing device may be any device that is capable of forming wireless connections with another device. Example computing devices include hearing devices, smartphones, tablets, laptops, desktops, and the like. Computing device 3010 may have processing circuitry 3020, such as a digital signal processor, a central processor, or the like. Processing circuitry 3020 may execute one or more instructions, which when executed by the processing circuitry cause the processing circuitry to perform various operations. These instructions may be stored on one or more machine readable mediums. Audio interface circuitry 3030 is circuitry which interfaces the processing circuitry 3020 with audio capture and reproduction hardware such as a microphone and a speaker. For example, audio from a microphone is transmitted through the audio interface circuitry 3030 to processing circuitry 3020 where processing software processes this audio. For example, the volume level of certain frequencies may be increased or decreased as indicated by one or more configuration files stored in a machine readable medium. The processed audio is then sent to a speaker through audio interface circuitry 3030 for playback.

Wireless circuitry 3040 is configured to communicate wirelessly through a connection (e.g., a piconet or scatternet) with one or more other devices. In some examples, the wireless circuitry may include host circuitry 3050 and controller circuitry 3060. Host circuitry in some examples is configured to implement a BLUETOOTH® Host functionality as defined by the BLUETOOTH® Special Interest Group (SIG). For example, in accordance with a BLUETOOTH standard such as Core Version 4.2 adopted Dec. 2, 2014 or the Core Specification Supplement v6 adopted Jul. 14, 2015. Host functionality may include a Logical Link Control and Adaption Protocol (L2CAP), Security Manager (SM), Attribute Protocol (ATT), Generic Access Profile (GAP), Generic Attribute Profile (GATT), and other profiles and functionality as desired. In general, the host circuitry 3050 may provide data encapsulation services to provide logical end to end communication of data. Host circuitry 3050 may also provide methods for establishing connections with other devices (e.g., pairing) and key distribution, and other secure connection functions. Host circuitry 3050 may also handle device discovery and connections. Host circuitry 3050 may also implement procedures to expose one or more items of data on the device known as 'attributes' to other devices, and the like.

Controller circuitry 3060 in some examples is configured to implement a BLUETOOTH® controller functionality as defined by the BLUETOOTH® SIG. For example, in accordance with a BLUETOOTH standard such as Core Version 4.2 adopted Dec. 2, 2014 or the Core Specification Supplement v6 adopted Jul. 14, 2015. Controller Circuitry 3060 may include host controller interface circuitry 3070. Host controller interface circuitry 3070 may provide a standardized interface between host circuitry 3050 and the controller circuitry 3060. Controller circuitry 3060 may include a link layer circuitry 3080, which controls the Radio Frequency (RF) state of the device. The RF state may be one of a plurality of predetermined states, such as standby, advertising, scanning, initiating, connected, or the like. In some examples, prior to connection, devices may send connectable advertisements (called advertisers) or listen for connectable advertisements from other devices and respond if they receive an advertisement (called an initiator). If the advertiser accepts, both devices enter a connected state. The initiator will become the master and the device that accepted the request becomes the slave.

Link layer circuitry 3080 may include channel map circuitry 3090 which may perform channel assessments and determine which channels to use for a given connection if the computing device 3010 is a master device of the connection. In some examples, the link layer circuitry 3080 may implement the method of FIG. 2, by utilizing the channel map of another wireless connection to which the device is connected.

Physical layer circuitry 3100 may implement one or more physical protocols including one or more modulation schemes. For example, a Gaussian Frequency-Shift Keying modulation operating in an Industrial, Scientific, and Medical (ISM) frequency band such as 2.4 GHz or 5 GHz. Physical layer circuitry 3100 may utilize the frequencies of the channels determined by link layer circuitry 3080, e.g., channel map circuitry 3090 to transmit and receive data over a wireless link.

While channel map circuitry 3090 was shown in the Link Layer circuitry 3080, in other examples, it may be in the physical layer circuitry 3100, the Host Controller Interface Circuitry 3070, or the Host circuitry 3050. The various circuitry described in FIG. 3 may be implemented by modifying the operation of one or more digital signal processors (DSPs), transceivers, or processors, using instructions (e.g., software) on a machine readable medium. For example, the circuitry described in FIG. 3 may be one or more modules as defined below. In other examples, the circuitry may be implemented by one or more dedicated circuits, such as an ASIC.

Figure 4:
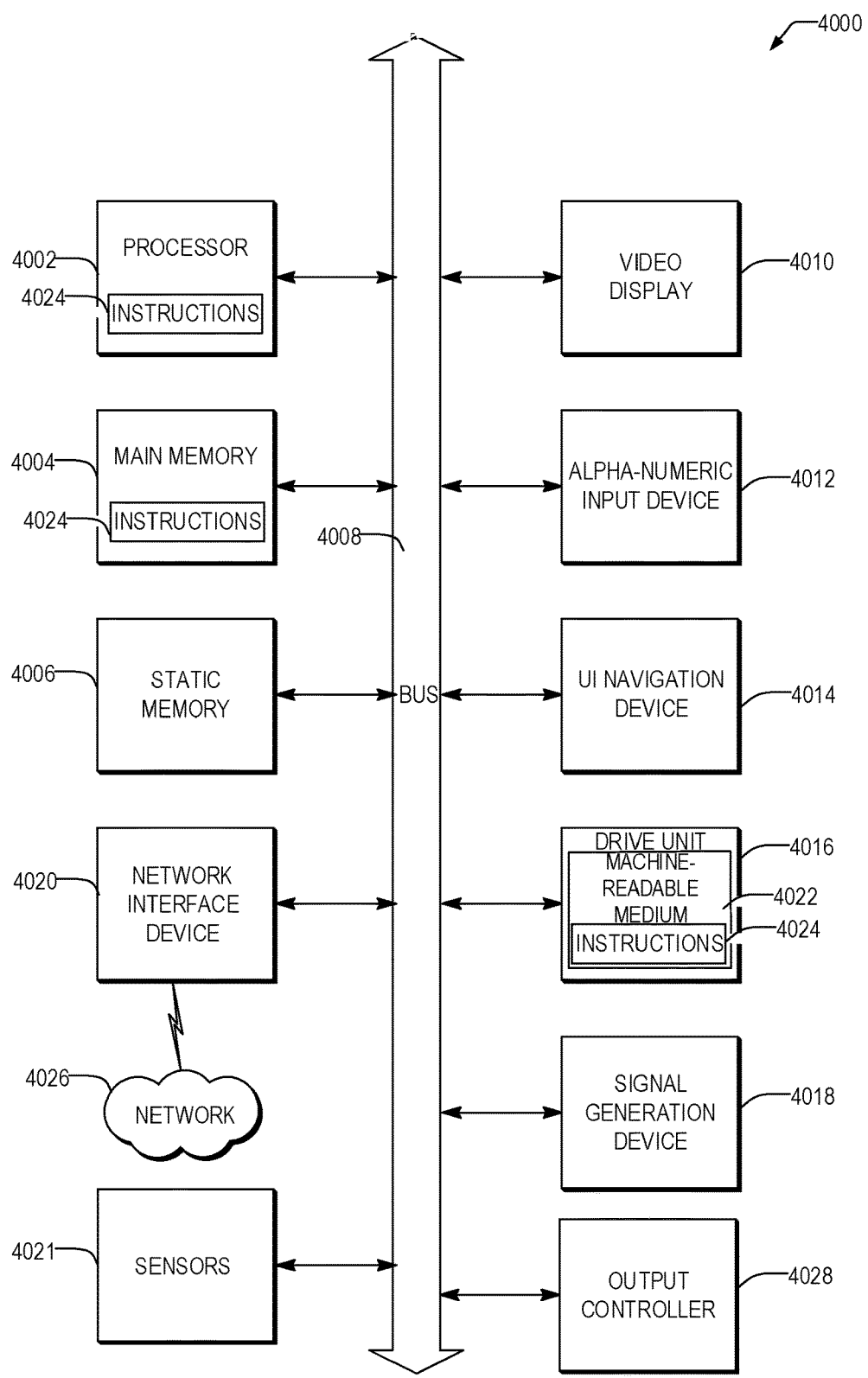
FIG. 4 is a block diagram illustrating an example of a machine upon which one or more embodiments may be implemented.

FIG. 4 illustrates a block diagram of an example machine 4000 upon which any one or more of the techniques (e.g., methodologies) discussed herein may perform. In alternative embodiments, the machine 4000 may operate as a standalone device or may be connected (e.g., networked) to other machines. In a networked deployment, the machine 4000 may operate in the capacity of a server machine, a client machine, or both in server-client network environments. In an example, the machine 4000 may act as a peer machine in peer-to-peer (P2P) (or other distributed) network environment. The machine 4000 may be a hearing device (e.g. a hearing aid), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 4000 may include a hardware processor 4002 (e.g., a central processing unit (CPU), a graphics processing unit (GPU), a hardware processor core, or any combination thereof), a main memory 4004 and a static memory 4006, some or all of which may communicate with each other via an interlink (e.g., bus) 4008. The machine 4000 may further include a display unit 4010, an alphanumeric input device 4012 (e.g., a keyboard), and a user interface (UI) navigation device 4014 (e.g., a mouse). In an example, the display unit 4010, input device 4012 and UI navigation device 4014 may be a touch screen display. The machine 4000 may additionally include a storage device (e.g., drive unit) 4016, a signal generation device 4018 (e.g., a speaker), a network interface device 4020, and one or more sensors 4021, such as a microphone, a global positioning system (GPS) sensor, compass, accelerometer, or other sensor. The machine 4000 may include an output controller 4028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 4016 may include a machine readable medium 4022 on which is stored one or more sets of data structures or instructions 4024 (e.g., software) embodying or utilized by any one or more of the techniques or functions described herein. The instructions 4024 may also reside, completely or at least partially, within the main memory 4004, within static memory 4006, or within the hardware processor 4002 during execution thereof by the machine 4000. In an example, one or any combination of the hardware processor 4002, the main memory 4004, the static memory 4006, or the storage device 4016 may constitute machine readable media.

While the machine readable medium 4022 is illustrated as a single medium, the term "machine readable medium" may include a single medium or multiple media (e.g., a centralized or distributed database, and/or associated caches and servers) configured to store the one or more instructions 4024.

The term "machine readable medium" may include any medium that is capable of storing, encoding, or carrying instructions for execution by the machine 4000 and that cause the machine 4000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 4024 may further be transmitted or received over a communications network 4026 using a transmission medium via the network interface device 4020. The Machine 4000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 4020 may include one or more physical jacks (e.g., Ethernet, coaxial, or phone jacks) or one or more antennas to connect to the communications network 4026. In an example, the network interface device 4020 may include a plurality of antennas to wirelessly communicate using at least one of single-input multiple-output (SIMO), multiple-input multiple-output (MIMO), or multiple-input single-output (MISO) techniques. In some examples, the network interface device 4020 may wirelessly communicate using Multiple User MIMO techniques.

Various embodiments of the present subject matter support wireless communications to and from a hearing device. In various embodiments the wireless communications can include standard or nonstandard communications. Some examples of standard wireless communications include link protocols including, but not limited to, BLUETOOTH®, IEEE 802.11 (wireless LANs), 802.15 (WPANs), 802.16 (WiMAX), cellular protocols including, but not limited to CDMA and GSM, ZIGBEE®, and ultra-wideband (UWB) technologies. Such protocols support radio frequency communications and some support infrared communications. Although the present system is demonstrated as a radio system, it is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

It is understood that variations in communications protocols, antenna configurations, and combinations of components may be employed without departing from the scope of the present subject matter. Hearing devices typically include an enclosure or housing, a microphone, hearing device electronics including processing electronics, and a speaker or receiver. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations. Hearing devices may include one or more and in some examples all of the components of FIG. 4.

It is further understood that any hearing device may be used without departing from the scope and the devices depicted in the figures are intended to demonstrate the subject matter, but not in a limited, exhaustive, or exclusive sense. It is also understood that the present subject matter can be used with a device designed for use in the right ear or the left ear or both ears of the wearer.

It is understood that, and as already noted, the hearing devices (e.g., hearing aids) referenced in this patent application include a processor (e.g., such as processor 4002 of FIG. 4). The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using sub band processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, and certain types of filtering and processing. In various embodiments the processor is adapted to perform instructions stored in memory which may or may not be explicitly shown. Various types of memory (e.g., such as static memory 4006, main memory 4004, or the like) may be used, including volatile and nonvolatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

The present subject matter is demonstrated for hearing devices, including, but not limited to headsets and hearing aids. Such hearing aids, include but are not limited to, behind-the-ear (BTE), in-the-ear (ITE), in-the-canal (ITC), receiver-in-canal (RIC), completely-in-the-canal (CIC), and invisible-in-the-canal (IIC) hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing devices generally, such as cochlear implant type hearing devices and such as deep insertion devices having a transducer, such as a receiver or microphone, whether custom fitted, standard, open fitted or occlusive fitted. It is understood that other hearing devices not expressly stated herein may be used in conjunction with the present subject matter.

What is claimed is:

1. A method comprising:
using a processor of a first hearing aid for:
receiving from a wireless device a first plurality of channels used for a first wireless connection with the wireless device;
responsive to receiving the first plurality of channels, selecting a second plurality of channels for a second wireless connection with a second hearing aid based upon the received first plurality of channels, the second plurality of channels including at least one of the first plurality of channels, the second wireless connection being an ear-to-ear wireless connection that is active at a time at least partially overlapping a time when the first wireless connection is active;
sending an identification of the second plurality of channels to the second hearing aid; and
communicating with the second hearing aid over the second wireless connection using the second plurality of channels.

2. The method of claim 1, wherein the second plurality of channels is a subset of the first plurality of channels.

3. The method of claim 2, wherein selecting the second plurality of channels for the second wireless connection with the second hearing aid based upon the received first plurality of channels comprises using all of the first plurality of channels except a predetermined number of reserved channels.

4. The method of claim 1, wherein receiving the first plurality of channels comprises receiving a channel map upon establishing the first wireless connection.

5. The method of claim 1, wherein receiving the first plurality of channels comprises receiving a channel map in a channel update message sent by a master device of the first wireless connection.

6. The method of claim 1, wherein the first wireless connection is a first piconet and the second wireless connection is a second piconet.

7. The method of claim 1, wherein communicating with the second hearing aid over the second wireless connection using the second plurality of channels comprises communicating using frequency hopping across the second plurality of channels.

8. A hearing aid configured to wirelessly communicate with a wireless device and another hearing aid, comprising:
   a processor; and
   a memory, including instructions, which when performed by the processor causes the hearing aid to at least:
      receive a first plurality of channels used for a first wireless connection with the wireless device;
      select a second plurality of channels for a second wireless connection being an ear-to-ear wireless connection with the other hearing aid, based upon the received first plurality of channels and responsive to receipt of the first plurality of channels, the second plurality of channels including at least one of the first plurality of channels, the second wireless connection occurring during at least a portion of the first wireless connection;
      send an identification of the second plurality of channels to the other hearing aid; and
      communicate with the other hearing aid over the second wireless connection using the second plurality of channels.

9. The hearing aid of claim 8, wherein the second plurality of channels is a subset of the first plurality of channels.

10. The hearing aid of claim 9, wherein the second plurality of channels comprises all of the first plurality of channels except a predetermined number of reserved channels.

11. The hearing aid of claim 8, wherein the first plurality of channels comprises a channel map.

12. The hearing aid of claim 8, wherein the first plurality of channels comprises a channel map from a master device of the first wireless connection.

13. The hearing aid of claim 8, wherein the first wireless connection is a first piconet and the second wireless connection is a second piconet.

14. The hearing aid of claim 8, wherein the hearing aid communicates using frequency hopping across the second plurality of channels.

15. A non-transitory machine readable medium, comprising instructions, which when performed by a machine being a hearing aid, causes the machine to perform operations comprising:
   receiving from a wireless device a first plurality of channels used for a first wireless connection with the wireless device;
   responsive to receiving the first plurality of channels, selecting a second plurality of channels for a second wireless connection being an ear-to-ear wireless connection with another hearing aid based upon the received first plurality of channels, the second plurality of channels including at least one of the first plurality of channels, the second wireless connection being active at a time at least partially overlapping a time when the first wireless connection is active;
   sending an identification of the second plurality of channels to the other hearing aid; and
   communicating with the other hearing aid over the second wireless connection using the second plurality of channels.

16. The non-transitory machine readable medium of claim 15, wherein the second plurality of channels is a subset of the first plurality of channels.

17. The non-transitory machine readable medium of claim 16, wherein selecting the second plurality of channels for the second wireless connection with the other hearing aid based upon the received first plurality of channels comprises using all of the first plurality of channels except a predetermined number of reserved channels.

18. The non-transitory machine readable medium of claim 15, wherein the operations of receiving the first plurality of channels comprises receiving a channel map upon establishing the first wireless connection.

19. The method of claim 1, wherein receiving from the wireless device the first plurality of channels used for the first wireless connection with the wireless device comprises receiving from a mobile device the first plurality of channels used for the first wireless connection with the mobile device.

20. The hearing aid of claim 13, wherein hearing aid is configured to be a slave device in the first piconet and a master device in the second piconet.

21. The non-transitory machine readable medium of claim 15, wherein receiving from the wireless device the first plurality of channels used for the first wireless connection with the wireless device comprises receiving from a mobile device the first plurality of channels used for the first wireless connection with the mobile device.

* * * * *